Patented Mar. 23, 1937

2,074,833

UNITED STATES PATENT OFFICE 2,074,833

SHAVING PREPARATION

Ralph H. Fash, Fort Worth, Tex.

No Drawing. Application January 11, 1934,
Serial No. 706,204

6 Claims. (Cl. 167—90)

The invention relates to a process for treating shaving preparations and has for its object the treatment of shaving preparations for the purpose of increasing the effective life of the razor blades used with said shaving preparations.

In experiments leading to the present invention, it was proved that razor blades used with the ordinary shaving preparations become jagged due to oxygen corrosion of the steel of the blades by the oxygen of the air, and that the corrosion soon caused the blades to lose their sharp cutting edge.

The invention aims to prolong the effective or useful life of razor blades by preventing corrosion of the blade and has for its object the treatment of shaving preparations to render them effective in producing a passive condition of the iron or steel of the blade, in which condition the blade efficiently resists corrosion.

A more specific object of the invention is to treat shaving preparations for the purposes stated by compounding with said preparations ingredients having passivating properties.

When metals are in a passive state, they resist the action of chemicals with which they ordinarily react. For example, iron or steel in a passive condition when placed in a solution of copper sulphate will not have formed on the same a coating of copper, which coating would form under similar conditions were the iron or steel not in a passive state. Also the well known rusting of iron or steel will be resisted when the metal is in a passive state.

The process comprehended by the invention for rendering the iron or steel of the razor blade passive consists in adding to shaving preparations oxidizing compounds such as chromic acid, chromates, dichromates, perchromates, peroxides, chlorates, perchlorates, perborates, permanganates, persulphates and nitrates of metals having a lower solution tension than passive iron or steel.

The above is not an attempt to list all of the compounds that are known to produce a passive condition of the razor blade but only those compounds that can be taken as indicative of a general class that may be used. It may be stated that all oxidizing compounds are not equally effective in producing passivity, a greater concentration being required of some compounds than of others, and it follows that all passivating agents are not suitable for use in shaving preparations.

Many theories have been advanced to explain the action by which metals are rendered passive. The generally accepted theory considers that the passivity of iron or steel is due to a tightly adhering invisible film of some oxide of iron. In order to appreciate the present invention, the condition of passivity of iron or steel must not be confused with the resistance to rusting exhibited by these metals when exposed to oxygen and water having a high pH value. The resistance to rusting under the latter conditions is occasioned by the formation of a film of iron hydroxide whose adherence to the metal, and therefore its protective quality, is dependent upon the hydrogen-ion concentration of the solution with which the iron or steel is in contact. While iron or steel in contact with oxygen and wet with a solution having a pH value of 9 will resist corrosion better than the same metal under similar conditions but wet with a solution having a pH value of 8, greater resistance to rusting would occur with the same metal under similar conditions with the pH value in excess of 9. In the case of passivity, only a small concentration of the agent is required to produce a passive state of the metal, and increasing the concentration of the agent above the amount necessary to produce the passive state does not increase the passivity thereof. The effect of using more of the agent than is necessary is to prolong the length of time of the passive state in the event circumstances are present which will destroy the same.

There are three general classes of shaving preparations in common use. These may be listed as follows:

(A) Shaving soaps;
(B) Soap type shaving creams;
(C) Brushless or latherless creams.

In general, the pH value of types A and B ranges from 9 to 9.5 while that of type C ranges from 7 to 8.5. Due to this difference in value of the hydrogen-ion concentration, razor blades used with types A and B last longer than when used with type C. Since it is not feasible to increase the pH value of shaving preparations materially above 9.5, because of the drying and irritating action which such preparations would have on the skin, the process of the present invention may be used to advantage on types A and B, as well as on type C. In shaving preparations of type C, water is emulsified in the preparation during the process of manufacture, and no additional water is added to it when used in shaving. With types A and B, additional water is added when they are used in shaving, necessitating a higher concentration of the passivating agent in the original shaving preparation so that the resulting lather will have a sufficient concentration of the passivating agent to effectively produce a passive condition of the steel of the razor blade with which the shaving preparation is used. Therefore, in general, it can be stated that a smaller concentration of the agent need be used with type C than with types A and B.

For purposes of explanation it may be stated that a shaving preparation of type C was treated satisfactorily by adding approximately one gram of sodium chromate to one pound of the shaving preparation. In a series of tests conducted on the same make of razor blade and under identical conditions, with the exception that the shaving preparation in the second test included the use of sodium chromate in the proportion stated above, it was found that the treated preparation increased the effective life of the razor blade at least fifty per cent. Similar tests have been conducted on preparations of types A and B with equally favorable results. The above amount of sodium chromate for the treatment of a pound of shaving preparation must not be taken as limiting the invention to this proportion for this particular agent but is to be considered merely as a guide in the treatment of various shaving preparations in accordance with the invention. The proportion of sodium chromate given does not represent either the maximum or minimum that can be successfully used, so that for manufacturing purposes, where a reduction in cost is of prime importance, the minimum effective amount will have to be determined for each shaving preparation. The same proportion of potassium chromate, sodium dichromate or potassium dichromate as given in the case of sodium chromate would be effective, and the same is true whether the shaving preparation is type A, B or C. This is because the amount of sodium chromate used was not the minimum and therefore the differences in molecular quantities would not affect the result.

As a further guide in compounding shaving preparations with the oxidizing compounds in accordance with the invention, it may be stated that there are present in various preparations substances which will react with the agent. As it is necessary that there remain after the reaction sufficient of the agent to cause passivity of the steel, varying amounts of agent are required, depending upon the composition of the shaving preparation and the particular passivating agent used. By reason of this uncertainty in the chemical make-up of shaving preparations, it is impossible to state definitely the required quantities of the various passivating agents for the various types of shaving preparations. In general, it may be stated that the invention comprehends the addition to shaving preparations of oxidizing compounds sufficient to produce the required passivity of the steel of the razor blade.

The passivating compounds may be added to the shaving preparations at any suitable stage in the manufacture of said preparations and for the most satisfactory results the said passivating compounds should be thoroughly mixed to incorporate them throughout the preparation with substantially uniform distribution. It can be stated that the passivating compounds added to the shaving preparations in accordance with the invention do not react chemically with said preparations to produce the beneficial result but retain their individual characteristics and form with the preparation an admixture. Therefore, it is necessary that the compounds should be thoroughly distributed throughout. The action of the passivating compounds on the razor blade during use of the shaving preparation is to form a tightly adhering film of iron oxide on the surface and edge of the blade. The act of shaving causes the film to be constantly broken but since the passivating compound is continuously in contact with the razor blade during the shaving operation, any breaks that may occur in the oxide film on the blade are immediately repaired by said compound. During use of the blade and during the interval of non-use the film is maintained complete and by reason thereof the dulling of the edge of the blade by corrosion is reduced to a minimum, resulting in a sharper blade having a considerably longer period of usefulness.

The invention is not to be limited to the specific details herein described as the invention may be carried out in other ways without departing from the spirit of the claims.

I claim:

1. A shaving preparation adapted to prolong the useful life of steel razor blades used with the same, comprising an oxidizing agent having passivating action on steel, and a material selected from the group of shaving aids consisting of shaving soap, soap-type shaving cream and brushless or latherless shaving cream.

2. A shaving preparation adapted to prolong the useful life of steel razor blades used with the same, comprising an ingredient selected from the group consisting of soluble chromates and dichromates, and a material selected from the group of shaving aids consisting of shaving soap, soap-type shaving cream and a brushless or latherless shaving cream.

3. A shaving preparation adapted to prolong the useful life of steel razor blades used with the same, comprising an ingredient selected from the group consisting of soluble chlorates, perchlorates and perborates, and a material selected from the group of shaving aids consisting of shaving soap, soap-type shaving cream and brushless or latherless shaving cream.

4. A shaving preparation adapted to prolong the useful life of steel razor blades used with the same, comprising chromic acid in an amount sufficient to produce a passivating action on the steel of the razor blades, and a material selected from the group of shaving aids consisting of shaving soap, soap-type shaving cream and brushless or latherless shaving cream.

5. A shaving preparation adapted to prolong the useful life of steel razor blades used with the same, comprising sodium chromate in an amount sufficient to produce a passivating action on the steel of the razor blades, and a material selected from the group of shaving aids consisting of shaving soap, soap-type shaving cream and brushless or latherless shaving cream.

6. A shaving preparation adapted to prolong the useful life of steel razor blades used with the same, comprising sodium chromate in the proportion of approximately .5% for producing a passivating action on the steel of the razor blades, and a material selected from the group of shaving aids consisting of shaving soap, soap-type shaving cream and brushless or latherless shaving cream.

RALPH H. FASH.